3,812,121
TETRAHYDROTHIOQUINAZOLINONES

John Paul Chupp, Kirkwood, Mo., assignor to Monsanto Company, St. Louis, Mo.
No Drawing. Filed Aug. 18, 1971, Ser. No. 172,914
Int. Cl. C07d 51/46
U.S. Cl. 260—251 A
7 Claims

ABSTRACT OF THE DISCLOSURE

Compounds and their preparation of the formula

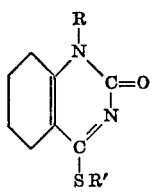

wherein R is selected from the group consisting of alkyl with from 1–6 carbon atoms, mono- and dihalophenyl and benzyl; and wherein R' is an aliphatic hydrocarbon radical of from 1 to 12 carbon atoms. The compounds are useful as biocides and plant growth regulators.

---

This invention relates to novel substituted tetrahydrothioquinazolinones compounds, their preparation and to their uses, particularly as herbicides and plant growth regulators.

The novel 1-substituted-5,6,7,8-tetrahydro-4-thioquinazolin-2(1H)-ones of this invention, which for convenience will be referred to as "quinazolinones," are of the formula

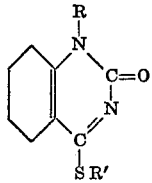

wherein R is selected from the group consisting of an alkyl of from 1–6 carbon atoms, cyclohexyl, mono- and dihalophenyl and benzyl; and wherein R' is a hydrocarbon radical of from 1 to 12 carbon atoms selected from the group consisting of alkyl, alkenyl, alkynyl and benzyl.

The term "alkyl" is intended to include saturated hydrocarbon radicals having straight or branched chains.

A preferred embodiment of this invention are those compounds in which R is alkyl and especially methyl and wherein R' is a hydrocarbon of from 4–8 carbons selected from the group consisting of alkyl, alkenyl, alkynyl and benzyl with benzyl being particularly preferred.

In preparing the afore-described quinazolinones, a novel cyclization procedure is employed involving carbamoyl chlorides as the starting material. More specifically, the starting carbamoyl chlorides are N-substituted-(1-cyclohexen-1-yl) carbamoyl chlorides of the following formula:

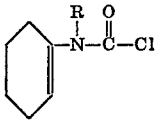

wherein R is as previously defined.

These compounds are known as are methods for their preparation. For example, they may be prepared via reaction of phosgene with an imine, with the imine in turn being derived from cyclohexanone. The following reactions illustrate a preparation:

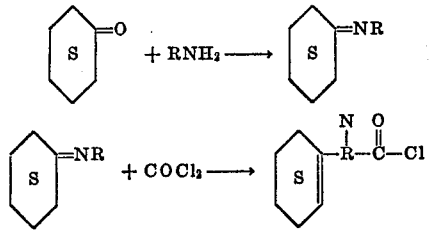

wherein R is as above defined.

Proceeding to a description of the initial cyclization step in the reaction cycle leading to the heterocyclic compounds of this invention, the carbamoyl chloride shown above is caused to react with a thiocyanate anion to form enecarbamoyl isothiocyanate, a transient product which rapidly transforms by ring closure to tetrahydro-4-thio-2,4(1H,3H)-quinazolinedione. The reaction is conducted in a solvent, which may be, for example, pyridine. The following equation illustrates the reaction:

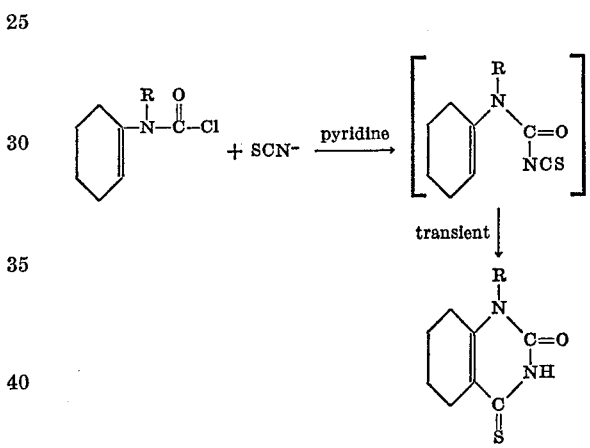

wherein R is as above defined.

In the reaction shown above the source of the thiocyanate anion is not critical. Any compound which readily releases thiocyanate ions in solution may be employed with ammonium thiocyanate being particularly suitable because of its relatively superior solubility characteristics.

When conducting the reaction, the carbamoyl chloride is added to a solution of; e.g., ammonium thiocyanate in pyridine, with the thiocyanate in slight excess. The homogeneous mixture is then refluxed for about 15 to 30 minutes. On cooling, the contents can simply be poured into water and the high purity product filtered off in yields ca. 80 percent.

It has been found that when basic heterocyclic compounds which contain a nitrogen hetero atom are employed as the reaction solvent, greatly increased yields of the desired product are realized. Pyridine and its homologs, such as the picolines, lutidines, collidines, parvulines, rubidine and viridine are particularly effective. Among other such type compounds which may be employed are pyrrole, indole, isoindole, quinoline and isoquinoline. Compounds of this class have a capability for effecting a homogeneous reaction system and tend to activate the normally sluggish carbamoyl chloride probably through complex formation. Moreover, they have a capability for initiating a fast, irreversible conversion of enecarbamoyl thiocyanate to enecarbamoyl isothiocyanate. Using pyridine merely to illustrate, this solvent catalyzed isomerization occurs as follows:

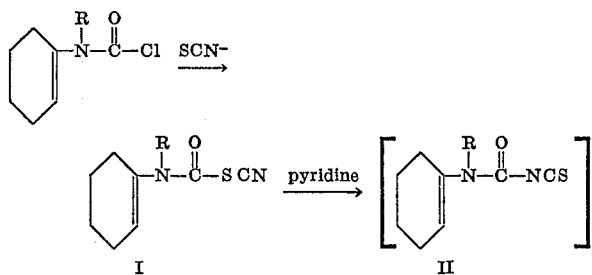

Compound I above is normally highly resistant to isomerization and its formation without subsequent conversion to Compound II greatly reduces realizable yields of the desired ultimate heterocycle product.

In the final preparatory step for producing the compounds of this invention, the tetrahydro-4-thio-2,4(1H, 3H)-quinazolinedione precursor, obtained as shown above, is alkylated on the sulfur of the molecule in accordance with the following reaction:

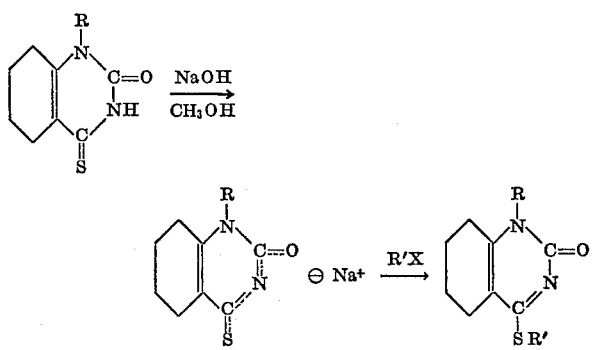

wherein R and R' are as defined above and X is a halide or sulfate.

As shown, the alkylation is conducted in a basic solution. The purpose of the alkali is to first convert the starting material to its corresponding salt with alkylation then occurring on the salt. The nature of the base or solvent is not critical. Suitable systems by way of example only include sodium methoxide in methanol, sodium methoxide in a mixture of dimethyl sulfoxide and methanol, potassium hydroxide in dimethyl sulfoxide and sodium hydroxide in water.

The reaction is carried out in conventional manner. That is, the starting material is first dissolved in the base containing solvent, after which a substantially equimolecular quantity of the halide or sulfate alkylating agent is introduced into the solution. The system is then heated to reaction temperature (60° C. or reflux, whichever is lower). The reaction is allowed to continue for from about 1 to 4 hours, after which the solvent is removed under vacuum and water added to the residue to give an acidic, clear solution. Upon making the solution basic with alkali, a solid product is recovered in better than 80 percent yield.

The following examples will serve to illustrate the invention in specific detail.

EXAMPLE 1

This example illustrates the preparation of the precursor compound, 5,6,7,8-tetrahydro-1-methyl-4-thio-2,4-(1H,3H)-quinazolinedione.

N-methyl-N(1-cyclohexen-1-yl)carbamoyl chloride (8.6 g., 0.05 mol) was placed in a dropping funnel and added to a solution of 0.05 mol (4 g.) ammonium thiocyanate dissolved in 80 ml. pyridine. The mixture was heated to reflux. Precipitate commenced to form at room temperature, which thickened as the temperature was raised. The material was heated at reflux (115°) for 15 minutes, then the solution was cooled. An Nmr analysis of the supernatant liquid indicated that complete reaction had taken place with typical spectral absorption for the desired quinazolinedione product. The solution was filtered to give a light yellow solution, and a white precipitate of ammonium chloride; followed by vacuum treatment of the filtrate to remove most of the solvent. The dry, but pyridine contaminated residue was then washed with water, brought to a pH ca. 5 with a small amount of concentrated hydrochloric acid and washed on the filter several times with water. After drying for one hour under vacuum at 80° C., a light yellow powdery product was formed which weighed 8.3 g., (85% yield), M.P. 254–256° C.

The following examples illustrate a number of other typical quinazolinedione precursor compounds which are readily convertible by the above-described alkylation procedure to the compounds of this invention. The preparations were made in accordance with the procedure of Example 1 by employing the appropriate N-substituted-(1-cyclohexen-1-yl) carbamoyl chloride to provide for variations in substitution on the 1-nitrogen of the resulting quinazolinone. The R designation in the following table defines the nature of the substitution in the compounds obtained which have the general formula

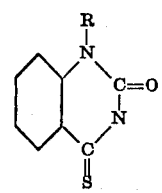

| Example | R | M.P., °C. | Percent yield | Molecular formula |
|---|---|---|---|---|
| 2 | $C_2H_5$ | 204–206 | 75 | $C_{10}H_{14}N_2OS$ |
| 3 | $(CH_3)_2CH$ | 255–259 | 72 | $C_{11}H_{16}N_2OS$ |
| 4 | $(CH_3)_2CHCH_2$ | 196–196.5 | 85 | $C_{12}H_{18}N_2OS$ |
| 5 | Cyclohexyl | 204–213 | 57 | $C_{14}H_{20}N_2OS$ |
| 6 | $C_6H_5CH_2$ | 219–227 | 76 | $C_{15}H_{16}N_2OS$ |
| 7 | $3,4(Cl)_2-C_6H_3$ | [1] 205 | 89 | $C_{14}H_{12}Cl_2N_2OS$ |

[1] Decomposition.

EXAMPLE 8

This example illustrates the preparation of 5,6,7,8-Tetrahydro-1-methyl - 4 - (methylthio)-2-(1H)-quinazolinone.

The compound of Example 1 (4 g., 0.204 mole) was mixed with an equivalent amount of sodium methoxide in methanol, heated to 60°, then cooled to room temperature. Methyl iodide (3.6 g., 0.025 mole) was added and the material heated for 1½ hours at reflux. The solvent was removed under vacuum and water added to the residue to give an acidic clear solution. Upon making the solution basic with alkali, 3.5 g. of solid product was recovered (82% yield). Recrystallization was effected from methyl-cyclohexane-toluene (charcoal). M.P. 150°–151° C.

EXAMPLE 9

This example illustrates the preparation of 5,6,7,8-tetrahydro-1 methyl-4(allylthio)-2-(1H)-quinazolinone.

The compound of Example 1 (5 g., 0.0256 mole) was placed in 50 ml. of glyme (dimethyl ether of ethylene glycol) and 5.7 g. of 25% solution of sodium methoxide in methanol was added. Allyl bromide (3.3 g., 0.027 mole) was added and the mixture heated at reflux for three hours. The solvents were evaporated and water added, and the mixture made basic (pH 11). The solution was filtered and air-dried to give 5.2 g. (87% yield). The material was recrystallized from methylcyclohexane-toluene.

EXAMPLE 10

This example illustrates the preparation of 1-methyl-4-(2 - propynyl-1-thio)-5,6,7,8-tetrahydro-2(1H) quinazolinone.

The compound of Example 1 (0.0204 mol, 4 g.) was placed in 75 ml. of dimethyl sulfoxide and 0.02 mol of 25 percent sodium methoxide in methanol (4.3 g.) was added. The material was stirred until all solid had dissolved, then 0.02 mol (2.4 g.) of propargyl bromide was added. The reaction mixture was permitted to stand overnite and thereafter poured into water to give 4.3 g. of a solid product (90 percent yield), M.P. 142.

Calc'd for $C_{12}H_{14}N_2OS$: C, 61.51; H, 6.02; N, 11.96; S, 13.68. Found: C, 62.23; H, 6.08; N, 12.09; S, 14.07.

EXAMPLE 11

This example illustrates the preparation of 5,6,7,8-Tetrahydro-1-methyl-4-(benzylthio) - 2 - (1H) quinazolinone.

The compound of Example 1 (1 g., 0.0057 mole) was dissolved in 30 ml. of water containing 0.225 g. of 97% sodium hydroxide. A small quantity undissolved was filtered off. The filtrate was then mixed with 0.8 g. of benzyl chloride in a flask. After shaking and raising the temperature of the reaction mixture to 60° C. with a heat gun, an oil formed which solidified on continued shaking and cooling. The material was filtered and the filtrate was washed with water to give 1.4 g. of crude solid (96% yield). Recrystallization was effected from methanol to give 0.75 g. of product. The recrystallization was repeated. The product had a sharp melting point at 166° C.

Calc'd for CHN: C, 67.1; H, 6.34; N, 9.78. Found: C, 66.5; H, 5.92; N, 9.38.

EXAMPLE 12

Employing the Example 8 procedure, the precursor compound 5,6,7,8 - tetrahydro-1-ethyl - 4 - thio-2,4-(1H, 3H) quinazolinedione was alkylated with propyl iodide to produce 5,6,7,8 - tetrahydro-1-ethyl - 4 - (propylthio)-2-(1H) quinazolinone in 95 percent yield (M.P. 116–117).

Employing the procedure of Example 8, but substituting for the methyl iodide the correspondingly appropriate halide or sulfate alkylating agent to account for the differences in the R' radical, the following compounds of this invention were obtained. As noted from the general formula, the compounds vary only in the R' radical.

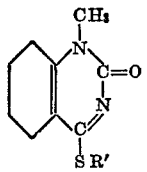

| Example | R' | M.P. °C. | Calculated C | Calculated H | Calculated N | Found C | Found H | Found N |
|---|---|---|---|---|---|---|---|---|
| 13 | $C_2H_5$ | 158–159 | 58.90 | 7.19 | 12.49 | 59.08 | 7.25 | 12.59 |
| 14 | $n-C_3H_7$ | 128–129 | 60.47 | 7.61 | 11.75 | 60.06 | 7.72 | 11.76 |
| 15 | $(CH_3)_2CH$ | 169–170 | 60.47 | 7.61 | 11.75 | 60.26 | 7.70 | 11.75 |
| 16 | $n-C_4H_9$ | 72–75 | 61.87 | 7.99 | 11.10 | 61.67 | 8.04 | 11.25 |
| 17 | $n-C_6H_{13}$ | 66–68 | 64-25 | 8.63 | 9.99 | 64.07 | 8.58 | 10.02 |
| 18 | $n-C_8H_{17}$ | 74–75 | 66.19 | 9.15 | 9.08 | 66.12 | 8.90 | 8.91 |
| 19 | $n-C_{10}H_{21}$ | 70–71 | 67.81 | 9.58 | 8.32 | 68.00 | 9.74 | 8.35 |

As previously noted, the afore-described novel compounds are useful as biocides. They have phytotoxic properties and can be employed to control certain noxious plants.

The phytotoxic property of these materials is illustrated in the table set out below where the activity of representative compounds against emergent plants is recorded. The various plant species of the spectrum employed in the test experiment are designated in the data table according to the following scheme.

A—General grass  
B—General broadleaf  
C—Morning glory  
D—Wild oats  
E—Brome grass  
F—Rye grass  
G—Radish  
H—Sugar beets  
I—Foxtail  
J—Crab grass  
K—Pigweed  
L—Soybean  
M—Wild buckwheat  
N—Tomato  
O—Sorghum The post-emergent phytotoxic activity index used in recording the results is based on the average percent injury of each plant species and is defined as follows:

| Average Percent injury | Numerical scale | Phytotoxic activity |
|---|---|---|
| 0–25 = | 0 | No phytotoxocity. |
| 26–50 = | 1 | Slight phytotoxicity. |
| 51–75 = | 2 | Moderate phytotoxicity. |
| 76–99 = | 3 | Severe phytotoxicity. |
| 100 = | 4 | Plants dead. |

The tests were conducted on 14 day old plant specimens by spraying them with acetone/water solutions containing 0.5 percent of the active ingredient (test compound) at a rate equal to approximately 10 pounds of active ingredient per acre. The treated plants are placed in a greenhouse and the effects are observed and recorded after a two week time lapse. The following results were obtained.

| Compound | A | B | C | D | E | F | G | H | I | J | K | L | M | N | O |
|---|---|---|---|---|---|---|---|---|---|---|---|---|---|---|---|
| 5,6,7,8-tetrahydro-1-methyl-4-(propylthio)-2-(1H)-quinazolinone | 0 | 2 | 1 | 1 | 1 | 1 | 3 | 2 | 1 | 1 | 3 | 1 | 2 | 3 | 1 |
| 5,6,7,8-tetrahydro-1-methyl-4-(octylthio)-2-(1H)-quinazolinone | 1 | 2 | 1 | 2 | 2 | 2 | 2 | 4 | 1 | 2 | 4 | 0 | 2 | 0 | 3 |

Additionally, it has been found that the compound 5,6,7,8 - tetrahydro - 1 - methyl-4-(benzylthio)-2-(1H) quinazolinone (Example 12) possesses plant growth regulating properties. This is manifested by an ability to effect growth retardation and an ultimate stature reduction in certain agricultural plants. The economic value of such property is apparent in that reduction in the stature of crop plants permits an increase in the plant population for a given growing area and will often result in significant increase in yield. In addition, reduction of stature increases accessibility to the field for operations, such as cultivation and ultimate harvesting. It has been found that a reduction in normal stature of certain plants also decreases the incidence of pest infestation. At the same time, such plants may demonstrate increased resistance to drought and/or increased hardiness to cold temperatures.

In order to demonstrate this activity, the following illustrative Examples of experimental tests are presented.

EXAMPLE 20

Six soybean plants of the Wayne variety are grown from seeds which have been planted in an aluminum pan. In preparation for planting, a 9⅝" x 5½" aluminum pan is level filled with soil and the soil is then compacted to a depth of approximately ⅜" from the top by means of a template tamper. After the seeds have been planted and pressed down with the tamper, a cover application of soil is added. The pans are then moved to a greenhouse bench where they are watered from below as needed. After one week of growth the plants are thinned so that at the start of the test there are three uniform plants in each pan. The height of each soybean plant is then measured to the tip of the terminal bud. A control pan, planted at the same time as the test pans, also has its plants measured in like manner, but receives no chemical treatment.

A 1% stock solution of the chemical of this invention in acetone is prepared. To a 2.0 ml. portion of this stock solution there is added 0.8 ml. of acetone and 2.8 ml. of a water mixture containing 0.05% of Aerosol OT. The resultant solution is then sprayed over the plants in each pan at an application rate equivalent to 6.0 lbs./acre. About two days following treatment each pan is fertilized with 40 ml. of a 1.5% solution of a commercial fertilizer.

Two weeks after treatment the height of each plant in the pans is again measured to the tip of the terminal bud. After determining the average height increase of the plants in the untreated control pan, it is found that at least two-thirds of the soybean plants treated with the compound of this invention show 26% or more stature reduction by direct comparison.

EXAMPLE 21

In this test, soybean plants of the corsoy variety are grown from seeds in individual plastic pots 8" in diameter. After four weeks of growth, the height of each plant is measured to the tip of the terminal bud. The plants are then sprayed with a solution of the chemical of this invention at an application rate equivalent to 8.33 lbs./acre, and fertilized.

Two weeks after treatment the height of the plant in each pot is again measured to the tip of the terminal bud, and an average height is determined for the untreated control plants. It is found that all of the soybean plants treated with the chemical of this invention were of a total height at least 15% less than the average of the plants in the control.

In preparing formulations for actual use either as a herbicide or plant growth regulant, the active ingredient is generally admixed with one or more adjuvants which can be solid or liquid extenders, carriers, diluents, conditioning agents and the like. The preferred formulations include wettable powders, aqueous suspensions, dust formulatins, emulsifiable oils and solutions in solvents. In general, these preferred compositions contain one or more surface-active agents. By the term "surface-active agent," is it understood that wetting agents, dispersing agents, suspending agents, and emulsifying agents are included therein.

Surface-active agents which can be used are known to those skilled in the art and have been well documented in U.S. Patents, bulletins and textbooks. For example, a number are set out in U.S. Pats. 2,426,417; 2,655,447; 2,412,510 and 2,139,276. A detailed list of such agents is also set forth by J. W. McCutcheon in "Soap and Chemical Specialties," November 1947, p. 8011 et seq. entitled "Synthetic Detergents"; and in Bulletin E–607 of the Bureau of Entomology and Plant Quarantine of the U.S. Dept. of Agriculture.

The amount of active ingredient to be employed in use will, of course, depend in large part upon the result desired. For purposes of plant growth regulation, the 5,6,7,8-tetrahydro - 1 - methyl - 4 - (benzylthio)-2-(1H)-quinazolinone compound will normally be employed at rates in the range of from about 0.05 to about 10.0 lbs./acre with an application rate of at least about 0.1 lbs./acre being preferred. In selecting appropriate rates, it will be recognized that precise dosages will be dependent upon the plant species being treated, the age or development stage of the plant, and various other factors well known to those skilled in the art. Moreover, those skilled in the art can readily determine the specific effective amount required for the plant growth regulating response desired.

In applications for the control of noxious weeds and plants, i.e., a herbicide use, the active agents are generally applied to the area being treated at a rate of from about 5 to about 50 or more pounds per acre. For most field applications, it is preferred to spray or dust the herbicidal compositions at the rate of about 8 to about 20 pounds per acre of the active ingredient. If, however, the herbicidal compositions are spread in a granular form over the area to be treated, it is preferred to employ a greater amount of active material, suitably in the range of about 10 to 30 pounds per acre.

The effective amount of the active agent for the various modes of application can best be stated in terms of the response intended, e.g., a plant growth regulant amount for stature reduction or a herbicidal amount for noxious plant control. Those skilled in the art can readily determine from the teachings of this specification the approximate application rates for any given purpose.

Effective amounts of the active agents of this invention are applied to the surface of soil or above ground surfaces of plants by conventional methods, e.g., by employing power dusters, boom and hand sprayers and spray dusters. The compositions can also be applied from airplanes as a dust or spray because of their effectiveness at low dosages.

For the purpose of determining the existence of biocidal activity of the compounds of this invention with respect to larvae of the western corn rootworm, *Diabrotica virgifera*, a soil insect causing substantial economic losses every year, the following test procedure was run:

A 1 ml. portion of an acetone/distilled water solution containing a known quantity in p.p.m. of the test compound is pipetted into a petri dish (100 x 15 mm.) having a sheet of filter paper (9 cm. diameter) placed in the center thereof. Two sections of corn roots (each 1 inch in length) are then placed in the dish, followed by infestation of the dish contents with newly hatched western corn rootworm larvae from diapaused eggs (5 larvae are placed in each dish). The petri dish is placed in a container to preserve moisture and thereafter inserted in a constant temperature-humidity box maintained at 25° C. and 70 percent relative humidity. After 24 hours mortalities are observed using a microscope for accurate reading.

A 60 percent mortality was observed at a concentration of 3 p.p.m. when 5,6,7,8-tetrahydro-1-methyl-4-(propynylthio)-2-(1H)-quinazolinone was employed as the test compound.

While the illustrative embodiments of the invention have been described herein before with particularity, it will be understood that various other modifications will be apparent to and can readily be made by those skilled in the art without departing from the scope and spirit of the invention. According, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:

1. A compound of the formula

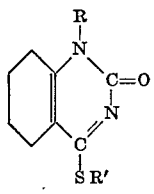

wherein R is selected from the group consisting of alkyl having from 1-6 carbon atoms, cyclohexyl, mono- and dihalophenyl and benzyl; and wherein R' is a hydrocarbon radical of from 1-12 carbon atoms selected from the group consisting of alkyl, alkenyl, alkynyl and benzyl.

2. A compound in accordance with claim 1 in which R is alkyl and wherein R' is a hydrocarbon of from 4–8 carbon atoms.

3. A compound according to claim 2 which is 5,6,7,8-tetrahydro - 1 - methyl-4-(benzylthio)-2-(1H)-quinazolinone.

4. A compound according to claim 1 which is 5,6,7,8-tetrahydro-1-methyl-4-(n - propylthio)-2-(1H)-quinazolinone.

5. A compound according to claim 1 which is 5,6,7,8-tetrahydro-1-methyl-4-(2 - propynyl-1-thio)-2-(1H)-quinazolinone.

6. A compound according to claim 2 which is 5,6,7,8-tetrahydro - 1 - methyl-4-(n-octylthio)-2-(1H)-quinazolinone.

7. A process for the preparation of compounds having the formula

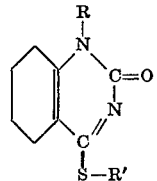

wherein R is selected from the group consisting of alkyl having from 1-6 carbon atoms, cyclohexyl, mono- and dihalophenyl and benzyl; and wherein R' is a hydrocarbon radical of from 1-12 carbon atoms selected from the group consisting of alkyl, alkenyl, alkynyl and benzyl; which comprises the following steps in sequence:

(A) reacting an N-substituted-(1-cyclohexen-1-yl)-carbamoyl chloride of the formula

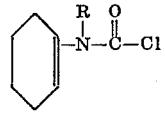

wherein R is as previously defined, with a thiocyanate anion to form an intermediate compound of the formula

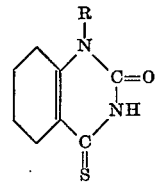

said reaction being effected in solution wherein the solvent is a basic heterocyclic compound containing nitrogen as the hetero atom, (B) bringing said intermediate compound into reactive contact with an alkali metal base in solution to form the alkali metal salt thereof, and (C) alkylating said alkali metal salt by reacting same with a compound of the formula

R'X wherein R' is as previously defined and X is selected from the group consisting of halide and sulfate.

References Cited

Lamon: J. Het. Chem., 1968, 5 (6), 837–44.

DONALD G. DAUS, Primary Examiner

R. V. RUSH, Assistant Examiner

U.S. Cl. X.R.

71—92; 424—251